UNITED STATES PATENT OFFICE.

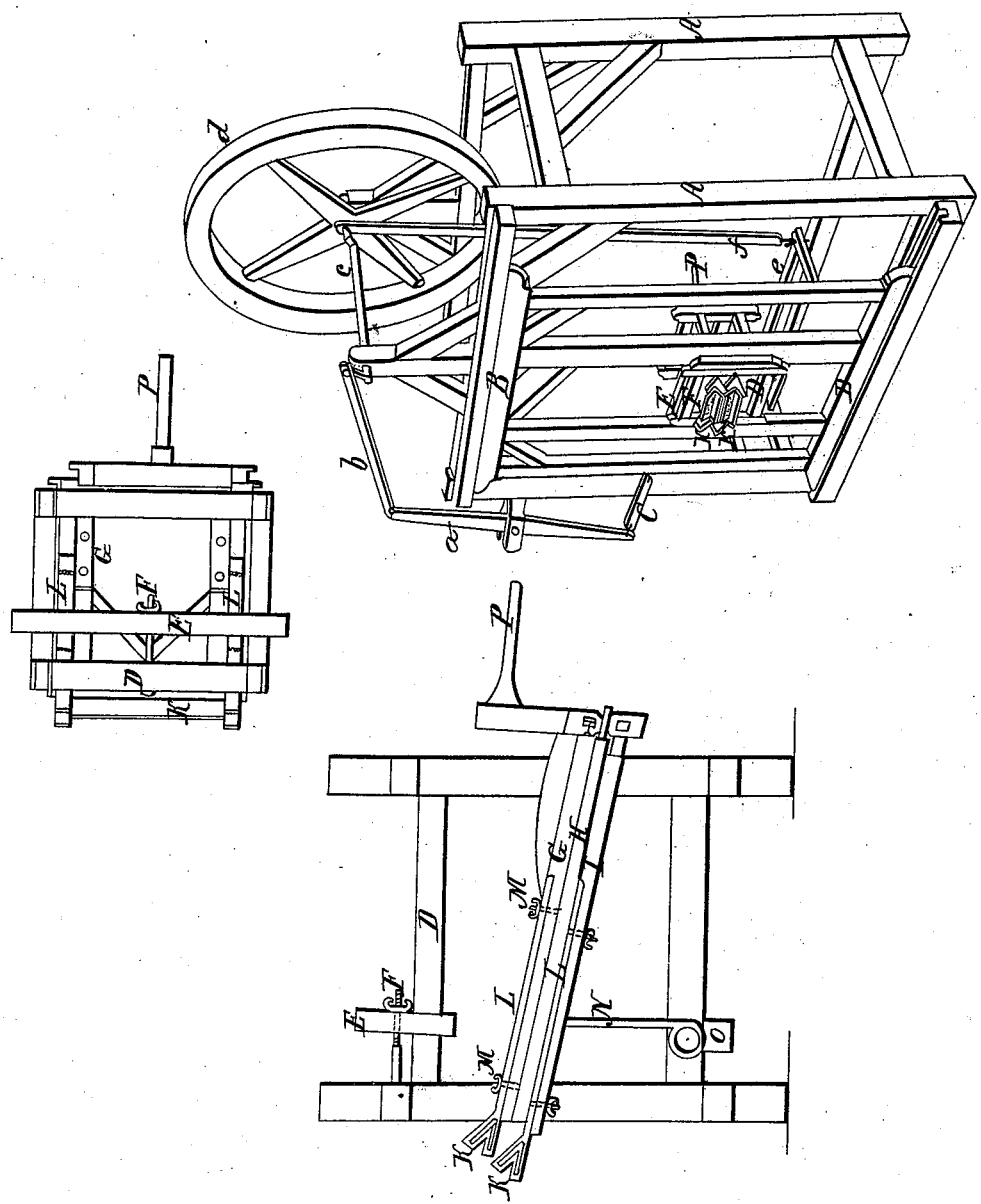

ELIJAH STOKER, OF PIQUA, OHIO.

MACHINE FOR FILING SAW-TEETH.

Specification of Letters Patent No. 76, dated November 8, 1836.

*To all whom it may concern:*

Be it known that I, ELIJAH STOKER, of Piqua, in the county of Miami and State of Ohio, have invented a new and useful Improvement in Machines for Filing Saws, which is described as follows, reference being had to the annexed drawings of the same, making part of this specification.

This machine consists of a suitable frame A, in which a grate B, is made to slide horizontally to the right, and left, said grate being attached by an arm C, or other suitable fixture to the machinery of the "go back" of a saw mill, or to other machinery for moving the same to the right, and left. The arm is attached to the gate by a hook and eye so that it may be unshipped at pleasure. In the sliding gate is arranged a sliding frame D, moved up and down by hand between two upright pieces of the before described gate, having a clamp bar E, and screw bolt F, to fasten it at any height required. In this last mentioned frame are arranged three parallel slides G, H, and I, placed one above the other at an angle of about 5 degrees with the horizon more or less, the upper and lower slide containing each two files K, placed with their edges together at such an angle as to form a figure corresponding with the shape of the saw-teeth to be filed, being held firmly by iron bars L, L, fastened to the upper and lower slides by screw bolts, M. The center slide H, is placed between the two slides just mentioned, and is attached to springs N, fastened to a cross piece O, of the vertically sliding frame, which springs are for bringing the slides, and files toward the saws, and suffering them to recede from them when it is required to change the files to a new set of teeth.

A lever, or handle P, whose fulcrum is at the hind end of the middle slide is attached by links, and staples to the upper and lower slides for moving them with the files in, and out, or to, and from the saw where the lever is moved to the right it advances the lower frame with its files, and at the same time causes the upper frame with its files to recede from the saw, and when moved to the left the opposite effect is produced.

The screw bolts M, pass through the bars containing the files and through each slide having their heads countersunk with the nuts on the outside for securing the bars.

Operation: The saw being clamped in the saw-gate, the filing machine is brought up to it. The arm of the sliding gate is connected by suitable gearing to the go-back of the sawmill; this sets the gate in motion, the vertically sliding frame having been set, and clamped opposite the teeth to be filed, the operator lays hold of the lever, and bears it from him. This causes the upper slide to advance with its files against the upper teeth, and when the gate has moved to the right as far as it will go, he instantly reverses the position of the lever, which brings the lower slide with the files in contact with the lower tooth where it is held till the gate has returned to the left, he then moves the lever to the right as before and in this manner the operation is continued till the teeth are sufficiently filed, he then draws back the slides till the files will pass the points of the teeth without touching them, the springs yielding, and suffering this to be done. The vertically sliding frame is then unclamped, and raised opposite the next two teeth, and then clamped; the springs bringing the slides to their proper places. The operation is then continued as before described, and in this manner the work progresses till all the teeth in the saw be properly filed.

Stops to prevent the slides advancing too far are placed on the rear end of the center slide. Instead of operating the files by the go-back of the sawmill, they may be operated by a treadle, and balance wheel geared in the manner represented in the drawing. $a$ being the lever, $b$, the connecting rod, $c$, crank shaft, $d$, balance wheel, $e$, treadle, $f$, connecting rod from the treadle to the crank. The saws may also be removed from the gate, clamped, and brought to the filing machine instead of the latter being brought to the saw, and they may be set to file the teeth at any required angle by means of set screws, and bars, and two or more teeth may be filed at the same time. Various files set at different angles may be used for filing various kinds of saws.

What I claim as my invention, and which I desire to secure by Letters Patent, consists in—

The before described machine for filing saws whether constructed in the precise manner above described, or in any other embracing the same principle for a similar purpose.

ELIJAH STOKER.

Witnesses:
WM. P. ELLIOT,
WM. BISHOP.